Sept. 16, 1958 R. W. VAN DINEN 2,852,265
WORK HOLDER AND CENTERING MEANS
Filed April 10, 1956 2 Sheets-Sheet 1

INVENTOR.
Raymond W. Van Dinen
BY
L. D. Burch
ATTORNEY

Sept. 16, 1958  R. W. VAN DINEN  2,852,265
WORK HOLDER AND CENTERING MEANS
Filed April 10, 1956  2 Sheets-Sheet 2

INVENTOR.
Raymond W. Van Dinen
BY
L. D. Burch
ATTORNEY

United States Patent Office 2,852,265
Patented Sept. 16, 1958

2,852,265

WORK HOLDER AND CENTERING MEANS

Raymond W. Van Dinen, Berkley, Mich., assignor to General Motors Corporation, Detroit, Mich., a corporation of Delaware Application April 10, 1956, Serial No. 577,326

5 Claims. (Cl. 279—66)

This invention relates to means for receiving, holding and centering a workpiece and particularly to a work holder chuck device for receiving a rotatable member such as a camshaft having eccentrics thereon and holding and centering the workpiece during the machining thereof.

It is common to use a three jaw work holder chuck during the machining of camshaft bearings. The work engaging jaws are generally secured to a fixed part of the work jaw and in centering the workpiece between the jaws, distortion of the camshaft often results. Following the rough machining operation the camshaft is required to be straightened and in the straightening process a high percentage of breakage results.

It is here proposed to modify the commonly known three jaw work holder chuck by simple and expedient means to eliminate the chance of distortion of work members, such as camshafts, received therein. It is proposed to employ a floating adjustable ring having clearance between itself and the chuck body to insure that variations in the circumference of the camshaft bearing or the like gripped by the work jaws do not cause the work chuck to distort the workpiece. The floating ring while a part of the chuck body is relatively self-adjustable with respect thereto and centers itself about the workpiece relative to the chuck body rather than distorting the workpiece in trying to center the workpiece relative to the work holding chuck.

Figure 1:
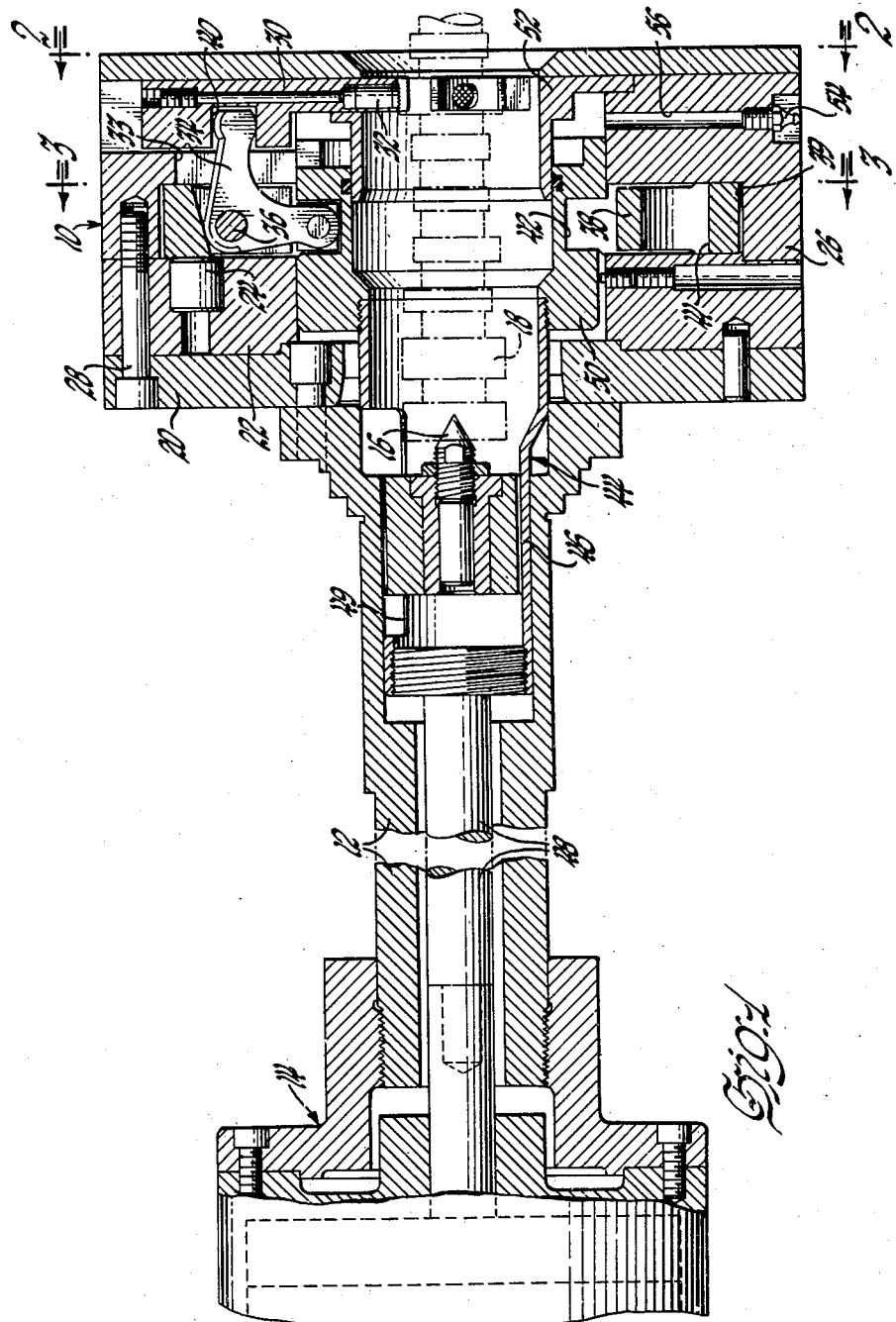
Figure 1 is a cross-sectional view of a three jaw work holder chuck modified to include the present invention.
Figure 2:
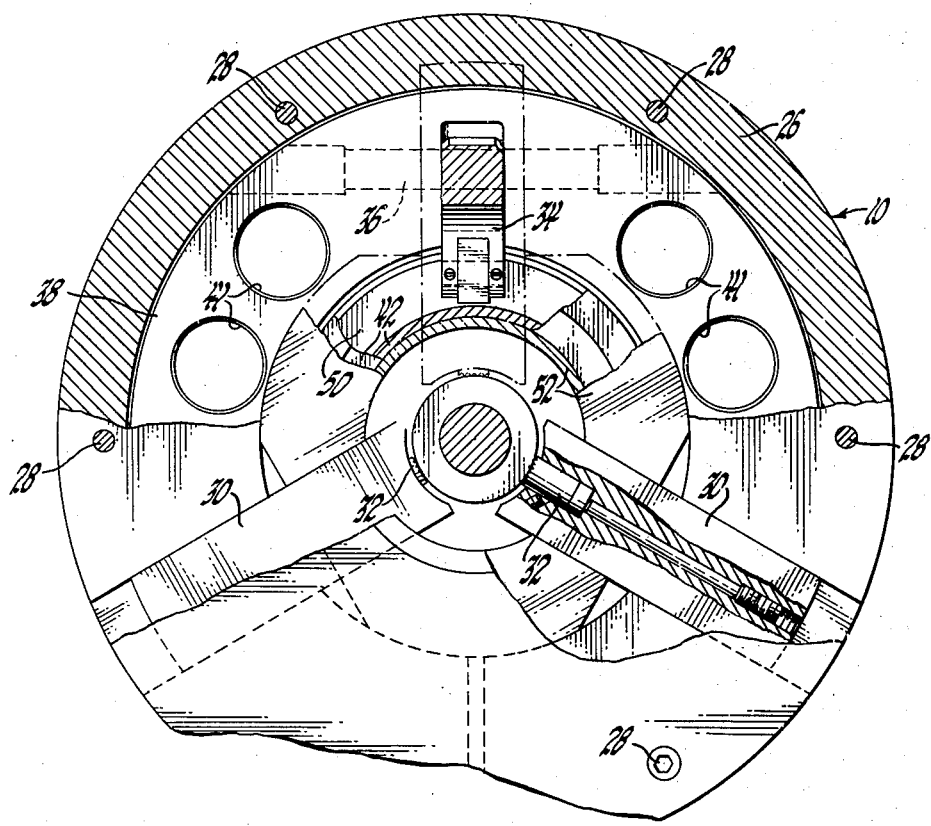
Figure 2 is an enlarged view of the work chuck shown in Figure 1 taken substantially in the plane of line 2—2 looking in the direction of the arrows thereon and having parts broken away and sectioned.
Figure 3:
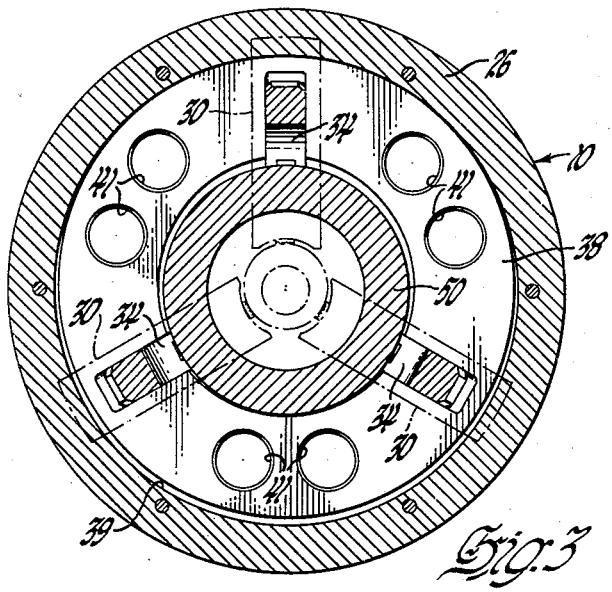
Figure 3 is a reduced cross-sectional view taken in the plane of line 3—3 of Figure 1 and looking in the direction of the arrows thereon.

The work holder device of the present invention includes a three jaw work receiving chuck 10 which may be secured to the end of a rotatable spindle 12 of a lathe or other work tool, the end of which is shown at 14. The spindle 12 includes a centering pin 16 secured within the spindle which receives the end of a workpiece shown in phantom in Figure 1 as at 18.

A backing plate 20 is secured to the spindle 12 and a spacer 22 including circumferentially disposed wear pads 24 is secured to the backing plate. The chuck body 26 is secured to the backing plate 20 by socket head screws 28 extending through the spacer.

The chuck body 26 includes a plurality of work jaw members 30, preferably three in number, slidably mounted and radially disposed near one end of the chuck body. Adjustable friction or traction surfaced plugs 32 are mounted within the jaws to minimize wear of the driven jaw members. The chuck body 26 is slotted as at 33 to receive bell crank like jaw knuckles 34 which are adapted to actuate the work jaw members.

The jaw knuckles 34 are pivotally secured on pins 36 to a freely disposed ring member 38 received within an annular groove 39 provided about the inner periphery of the chuck body 26 adjacent the spacer 22. Sufficient radial clearance is provided to enable radial adjustment of the ring. The holes 41 are for lightening the weight of the ring. The ends of the bell crank like jaw actuators 34 are engaged within recesses 40 provided in the work jaw members 30 and recesses 42 provided in a sleeve member 44, about to be described.

Sleeve member 44 is disposed within the chuck body 26 and is axially slidable relative thereto. The sleeve member 44 includes a draw sleeve 46, secured to a draw rod 48 extended through spindle 12, and is cut away as at 49 to prevent interference with the centering pin 16. An enlarged collar member 50 is secured to the end of the draw sleeve 46 and includes the recesses 40. An annular member 52 secured to the chuck body 26 extends centrally therein to receive and support the end of the sleeve member 44. A lubricant fitting 54 and passage 56 provide means for lubricating the slidable sleeve.

Having generally described the chuck device as to structure, the merits of the present invention as included within this structure will now be described in more detail.

It will be appreciated that the draw bar 48 as operated by hydraulic, air or other means to move the sleeve member 44 axially within the chuck body 26, pivots the bell crank members, or jaw knuckles, 34 about pivot pins 36 to move the work jaws 30 relative to the workpiece 18. Heretofore, the pivotal jaw actuators have been mounted directly upon the chuck body and because the chuck body was fixed relative to the chuck, the jaws acted to distort the workpiece in centering it relative to the spindle. However, with the pivotal jaw knuckles 34 mounted upon a ring member 38 which is free-floating and self-adjusting, the jaws clamp upon the workpiece and center themselves relative thereto by adjusting the ring member within the clearance provided the ring member. The ring is restrained against rotation relative to the chuck body 26 by the ends of the bell crank actuators 34 extended through slotted accesses 40 and the other end of the actuators are long enough to remain in engagement with the collar of sleeve member 44 in the course of its self-adjustment.

I claim:

1. A work holder device comprising a work receiving chuck having a plurality of work engaging jaw members mounted therein, a sleeve member mounted within said chuck, jaw actuating means engaged by said sleeve member and in turn operatively engaged with said jaw members, said jaw actuating means including a self-adjusting free-floating ring member disposed within said chuck between said sleeve member and said jaw members.

2. In a work holder device comprising a chuck formed to receive a work member centrally therein, jaw members mounted within said chuck and circumferentially disposed therearound, sleeve means mounted within said chuck, and means operatively connecting said jaw members to said sleeve member for radially adjusting said jaws upon axial movement of said sleeve; said last-mentioned means including a free-floating ring member mounted within said chuck and having a plurality of bell crank members pivotally secured thereto and having opposite ends thereof engaged with said sleeve and jaw members respectively.

3. In a work holder device as described by claim 2 said bell crank members each having one end axially disposed for engagement with said sleeve member and the other end radially disposed for engagement with one of said jaw members.

4. In a work holder device as described by claim 3 said jaw members being each individually adjustable and each radially disposed and slidably mounted within said chuck for simultaneous adjustment by said bell crank members, and said sleeve member being axially disposed for reciprocal movement and actuation of said bell crank members to effect the aforesaid adjustment of said jaw members simultaneously.

5. A work chuck device for use with a machine tool for working forged crankshafts and the like and which includes a work holder secured to a drive spindle having a work centering pin provided at the end thereof, said work holder including radially disposed and slidably mounted work jaw members provided therein and spaced apart from said centering pin, a free floating and radially adjustable ring member mounted within said work holder and disposed next adjacent said jaw members, a sleeve member concentrically disposed about said centering pin for reciprocal movement without affecting said pin, and bell crank lever arms pivotally mounted upon said ring member and each having one lever arm thereof axially disposed and engaged with one of said jaw members and the other lever arm radially disposed and engaged with said sleeve member, said sleeve member being axially reciprocal for radially adjusting said work jaw members via said bell crank lever arms and said ring member being in turn radially adjustable as necessary to permit said jaw members each being engaged with a work member received within said work chuck device.

References Cited in the file of this patent

UNITED STATES PATENTS

| | | |
|---|---|---|
| 1,446,060 | Pratt | Feb. 20, 1923 |
| 2,524,485 | Sloan | Oct. 3, 1950 |
| 2,703,242 | Sloan et al. | Mar. 1, 1955 |
| 2,794,648 | Sampson | June 4, 1957 |